United States Patent
Shiraishi

[11] Patent Number: 5,944,771
[45] Date of Patent: Aug. 31, 1999

[54] ARITHMETIC OPERATION SYSTEM FOR BINARY ADDITION/SUBTRACTION

[75] Inventor: Mikio Shiraishi, Yokohama, Japan

[73] Assignee: Kabushiki Kaisha Toshiba, Kawasaki, Japan

[21] Appl. No.: 08/927,806

[22] Filed: Sep. 11, 1997

[30] Foreign Application Priority Data

Sep. 12, 1996 [JP] Japan .................................. 8-242082

[51] Int. Cl.$^6$ ................................ G06F 7/00; G06F 7/50
[52] U.S. Cl. ....................... 708/201; 708/671; 340/146.2
[58] Field of Search ........................... 364/715.012, 769, 364/737; 340/146.2

[56] References Cited

U.S. PATENT DOCUMENTS 5,373,459  12/1994  Taniguchi ......................... 364/715.012
5,563,813  10/1996  Chen et al. ....................... 364/715.012
5,793,655   8/1998  Harlap et al. .................... 364/715.012

FOREIGN PATENT DOCUMENTS 7-49778   2/1995   Japan .

Primary Examiner—Tan V. Mai
Attorney, Agent, or Firm—Banner & Witcoff, Ltd.

[57] ABSTRACT

In an arithmetic operation circuit, a coincidence detector receives the sign bits of binary data so as to output a truth coincidence detection signal when the two sign bits coincide with each other, and to output a false coincidence detection signal when they do not coincide with each other. A data inverter outputs a logic-inverted signal of each bit of the data when the coincidence detection result is truth, and outputs a signal equal to the data when the coincidence detection result is false. An adder receives the coincidence detection signal as a carry signal, and outputs the sum of the data and the output from the data inverter. A flag generator receives the sign bit of the data and the sign bit of the sum from the adder, and selectively outputs the sign bit or its inverted bit.

26 Claims, 11 Drawing Sheets

FIG. 11

| CONDITIONS | SIGN Xs | ARITHMETIC OPERATIONS Z | FLAG SF |
|---|---|---|---|
| Xs=Ys | +(0) | Z=X−Y (=\|X\|−\|Y\|) | SF=Zs |
| | −(1) | Z=X−Y (=\|Y\|−\|X\|) | SF=/Zs |
| Xs≠Ys | +(0) | Z=X+Y (=\|X\|−\|Y\|) | SF=Zs |
| | −(1) | Z=X+Y (=\|Y\|−\|X\|) | SF=/Zs |

FIG. 12

| CONDITIONS | SIGN Ys | ARITHMETIC OPERATIONS Z | FLAG SF |
|---|---|---|---|
| Xs=Ys | +(0) | Z=X−Y (=\|X\|−\|Y\|) | SF=Zs |
| | −(1) | Z=X−Y (=\|Y\|−\|X\|) | SF=/Zs |
| Xs≠Ys | +(0) | Z=X+Y (=\|Y\|−\|X\|) | SF=/Zs |
| | −(1) | Z=X+Y (=\|X\|−\|Y\|) | SF=Zs |

| CONDITIONS | SIGN Xs | SIGN Ys | ARITHMETIC OPERATIONS Z | FLAG SF |
|---|---|---|---|---|
| Xs = Ys | + (0) | + (0) | $Z = X - Y \ (= |X| - |Y|)$ | $SF = Zs$ |
|  | − (1) | − (1) | $Z = X - Y \ (= |Y| - |X|)$ | $SF = /Zs$ |
| Xs ≠ Ys | + (0) | − (1) | $Z = X + Y \ (= |X| - |Y|)$ | $SF = Zs$ |
|  | − (1) | + (0) | $Z = X + Y \ (= |Y| - |X|)$ | $SF = /Zs$ |

NOTE: /Zs REPRESENTS INVERTED Zs

FIG. 13

ARITHMETIC OPERATION SYSTEM FOR BINARY ADDITION/SUBTRACTION

BACKGROUND OF THE INVENTION

The present invention relates to an arithmetic operation system for adding/subtracting binary data and, more particularly, to an arithmetic operation circuit which is suitable for high-speed processing of magnitude comparison between digital signals, and usable in an arithmetic logic unit (ALU) such as a microprocessor or a digital signal processor (DSP).

In comparing the magnitudes of two binary numbers, if the two binary numbers have positive and negative signs, they must be compared using their absolute values. For example, in detecting the peak of digital audio data, successive comparison between the absolute values of many digital audio sample data is repeatedly executed.

In this case, the successive comparison can be realized by calculating the absolute values of all the sample data in advance to compare the absolute values, or comparing the sample data while calculating the absolute value of each sample data every comparison.

Normally, to calculate the absolute value in the two's compliment expression employed as the expression form of data with a sign, the logic of the whole data is inverted depending on the sign bit of the data, and then "1" is added to the least significant bit (LSB). For this reason, an arithmetic operation circuit for adding "1" to the LSB is required in addition to an arithmetic operation circuit for performing comparison. Absolute values can be compared only when a total of two adders are prepared.

In a conventional absolute value comparator, upon reception of data X and Y with two signs (a, b) to be compared with each other, all the bits are inverted depending on respective sign bits a and b. Then, corresponding sign bits (a, b) are added to the least significant bits (LSB) of the all-bit-inverted data (X, Y). In this manner, the absolute values of binary data X and Y expressed by two's complements are calculated.

The magnitude relationship between calculated absolute values |X| and |Y| is determined by a no-sign comparator. If SF represents a sign flag (or arithmetic operation flag), this comparator outputs, as the comparison result, $SF=1$ for $|X| \leq |Y|$ $SF=0$ for $|X| > |Y|$ In the conventional circuit which calculates the absolute values of all input data in advance to compare them, the time required for arithmetic processing is long. Since processing of calculating the absolute values of data X and Y to be compared with each other must be performed for both X and Y, the total processing time is three times or more than the time required when data with no sign are compared.

When data before calculating its absolute value must be saved, a location for storing absolute value data |X| and |Y| must be ensured. The maximum memory capacity necessary for arithmetic processing is about two times the capacity required when data with no sign are compared.

In the method of comparing data while calculating the absolute value of each data every comparison, the necessary memory capacity does not increase. However, the processing time is three times or more than the time required when data with no sign are compared. In this method, if the processing time is shortened to about the time required when data with no sign are compared, the hardware amount (or processing ability required for the hardware) increases about three times.

In this manner, when the magnitudes of binary numbers expressed by two's complements are compared in the conventional arithmetic operation circuit, the processing time is undesirably long. If this processing time is shortened, the necessary hardware amount (necessary hardware processing ability) disadvantageously increases.

BRIEF SUMMARY OF THE INVENTION

It is an object of the present invention to provide an arithmetic operation system capable of comparing two binary data at a high speed.

It is another object of the present invention to provide an arithmetic operation circuit capable of comparing the magnitudes of two binary numbers expressed by two's complements at a high speed with a relatively small hardware amount.

To achieve the above objects, according to the present invention, there is provided first means for generating, in response to a sign bit of first binary input data and a sign bit of second binary input data, a truth coincidence detection signal when the sign bits coincide with each other, and a false coincidence detection signal when the sign bits do not coincide with each other;

second means for generating, in response to the first binary input data and the coincidence detection signal, an inverted binary signal obtained by inverting a logical level of each bit constituting the first binary input data when the coincidence detection signal is truth, and a non-inverted binary signal obtained without inverting the logical level of each bit constituting the first binary input data when the coincidence detection signal is false, and supplying a selection binary signal equal to either one of the inverted binary signal and the non-inverted binary signal in correspondence with the truth and false coincidence detection signals;

third means, connected to the first and second means, and responsive to the coincidence detection signal as a carry signal, for performing a binary operation for the second binary input data and the selection binary signal to supply an arithmetic operation result with a sign bit; and fourth means, connected to the third means, and responsive to the sign bit of the second binary input data and the sign bit of the arithmetic operation result, for supplying an arithmetic operation flag equal to either one of the sign bit of the arithmetic operation result, and an inverted sign bit obtained by inverting the sign bit of the arithmetic operation result, in correspondence with contents of the sign bit of the second binary input data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 11 is a table which is applied to the arithmetic operation circuit in FIG. 1, and shows arithmetic operation result Z and its sign SF in correspondence with the presence/absence of sign coincidence between inputs subjected to an arithmetic operation, and the sign (Xs) of one of the inputs subjected to an arithmetic operation;

FIG. 12 is a table which is applied to the arithmetic operation circuit in FIG. 2 or 3, and shows arithmetic operation result Z and its sign SF in correspondence with the presence/absence of sign coincidence between inputs subjected to an arithmetic operation, and the sign (Ys) of the other input subjected to an arithmetic operation; and FIG. 13 is a table showing the contents of FIGS. 11 and 12 at once.

DETAILED DESCRIPTION OF THE INVENTION

Figure 1:
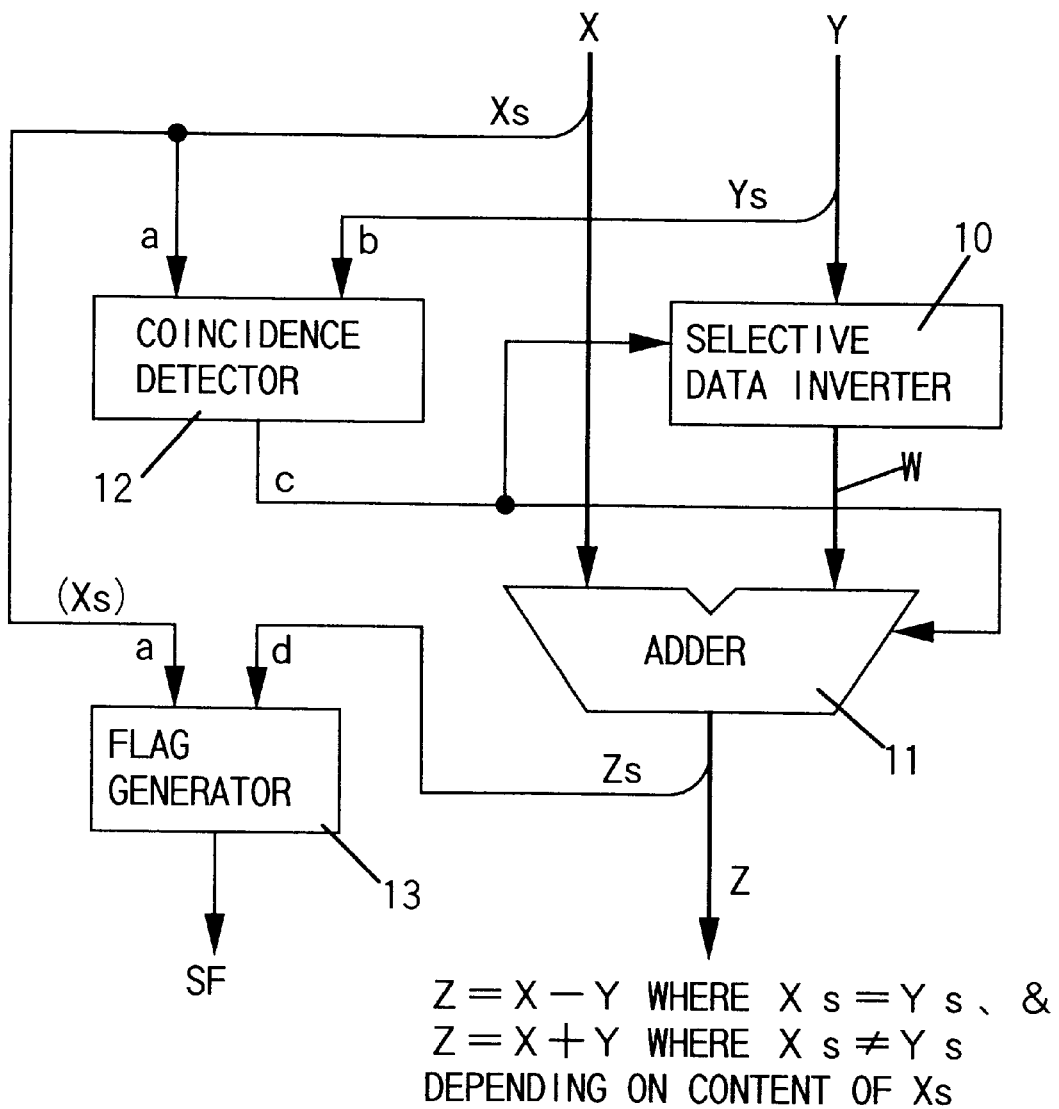
FIG. 1 is a block diagram showing the arrangement of an arithmetic operation circuit according to the first embodiment of the present invention.

The principle of the present invention will be described prior to a description of an embodiment of the present invention. Assume that X and Y represent binary data which have a plurality of bits expressed by two's complements, and are to be compared with each other; Xs and Ys, the sign bits of binary data X and Y; and $|X|$ and $|Y|$, the absolute values of binary data X and Y. The following two arithmetic operations are performed for two binary data X and Y.
<Case 1> If Xs=Ys, $$Z=X-Y=(1-2Xs)|X|-(1-2Ys)|Y| \quad (1)$$

<Case 2> If Xs≠Ys, $$Z=X+Y=(1-2Xs)|X|+(1-2Ys)|Y| \quad (2)$$

When signs are practically assigned to Xs and Ys, each of the arithmetic operations is divided into two depending on sign X of comparison data X. That is,
<Case 1-1> If Xs=Ys, and Xs is positive (=0), $$Z=|X|-|Y| \quad (3)$$

<Case 1-2> If Xs=Ys, and Xs is negative (=1), $$Z=|Y|-|X| \quad (4)$$

<Case 2-1> If Xs≠Ys, and Xs is positive (=0), $$Z=|X|-|Y| \quad (5)$$

<Case 2-2> If Xs≠Ys, and Xs is negative (=1), $$Z=|Y|-|X| \quad (6)$$

The above arithmetic operation results can be rewritten as follows. That is, in <Case 1-1> and <Case 2-1>, $$\begin{array}{l} \text{if } Z<0, |X|<|Y| \\ \text{if } Z=0, |X|=|Y| \\ \text{if } Z>0, |X|>|Y| \end{array} \quad (7)$$

In <Case 1-2> and <Case 2-2>, $$\begin{array}{l} \text{if } Z<0, |X|>|Y| \\ \text{if } Z=0, |X|=|Y| \\ \text{if } Z>0, |X|<|Y| \end{array} \quad (8)$$

The magnitude relationship between absolute values $|X|$ and $|Y|$ corresponding to the sign of arithmetic operation result Z in <Case 1-1> and <Case 2-1> is reverse to that in <Case 1-2> and <Case 2-2>. To distinguish the reverse relationships, arithmetic operation flag SF is defined as follows:

$$SF=1 \text{ for } |X|<|Y|$$

SF is indefinite (0 or 1) for $|X|=|Y|$ $$SF=0 \text{ for } |X|>|Y| \quad (9)$$

If the sign of arithmetic operation result Z is expressed by Zs, in <Case 1-1> and <Case 2-1>, $$SF=Zs \quad (10)$$

in <Case 1-2> and <Case 2-2>, $$SF=/Zs \quad (11)$$

where sign /Zs is the bit-inverted value of sign Zs.

On the basis of the above definitions, arithmetic operation flag SF can be generated without calculating the absolute values of X and Y. The above relationship is summarized in a table of FIG. 11.

The table in FIG. 11 is related to a case wherein attention is given to sign Xs of data X. Even if attention is given to sign Ys of data Y, the same arithmetic operation relationship can be obtained.

The relationship in this case is summarized in a table of FIG. 12.

Arithmetic operation flag SF obtained when attention is given to both sign Xs of data X and sign Ys of data Y is summarized in FIG. 13.

As is apparent from the tables in FIGS. 11 to 13, the inversion/non-inversion conditions of sign Zs of Z as the result of addition (=X+Y) or subtraction (=X−Y) change depending on the case wherein the signs of comparison data X and Y coincide with each other, or the case wherein they do not coincide with each other. That is, paying attention to the sign (Ys) of Y, if Y is negative (Ys=1) for Xs=Ys, the arithmetic operation flag is inverted (SF=/Zs), and if Y is positive (Ys=0) for Xs≠Ys, the arithmetic operation flag is inverted (SF=/Zs).

On the other hand, giving attention to the sign (Xs) of X,
if X is negative (Xs=1) regardless of Xs=Ys or Xs≠Ys, the arithmetic operation flag is inverted (SF=/Zs).

FIG. 1 is a block diagram showing the arrangement of an arithmetic operation circuit according to the first embodiment of the present invention. This arithmetic operation circuit performs an arithmetic operation like the one shown in the table of FIG. 11 on the basis of the above principle to output, together with arithmetic operation result Z, the magnitude comparison result (arithmetic operation flag SF) of the absolute values of binary data X and Y constituted by a plurality of bits expressed by two's complements. This arithmetic operation circuit is constituted by selective data inverter 10, adder 11, coincidence detector 12, and flag generator 13.

More specifically, one binary data X is supplied to one input terminal of adder 11. Sign bit a (=Xs) of this data X is supplied to coincidence detector 12 and flag generator 13. The other binary data Y is supplied to data inverter 10. Sign bit b (=Ys) of this data Y is supplied to coincidence detector 12.

Depending on the coincidence detection result (c) of coincidence detector 12, data inverter 10 outputs data Y without any change, or inverts all the bits of data Y to output data Y. Output W (Y or inverted W) of data inverter 10 is supplied to the other input terminal of adder 11.

Coincidence detector 12 detects coincidence/noncoincidence between sign bits a and b of data X and Y. That is, the conditions (Xs=Ys or Xs≠Ys) in FIGS. 11 to 13 are detected by coincidence detector 12. Of these conditions, Xs=Ys is indicated by coincidence detection result "c=1", and Xs≠Ys is indicated by "c=0". This coincidence detection result c is supplied to data inverter 10 and adder 11.

Data inverter 10 properly inverts data Y on the basis of coincidence detection result c of coincidence detector 12 (in this case, data inverter 10 is designed to invert all the bits of data Y to output bit-inverted data W when c=1).

In adding data X, and output W from data inverter 10, adder 11 also adds coincidence detection result c from coincidence detector 12. Adder 11 outputs addition result Z of data X, output W from data inverter 10, and coincidence detection result c. Sign bit d of this addition result Z is supplied to flag generator 13.

Flag generator 13 outputs arithmetic operation flag SF depending on sign bit a (=Xs) of data X and sign bit d (=Zs) of arithmetic operation result Z.

In the arithmetic operation circuit shown in FIG. 1, coincidence detector 12 detects coincidence/noncoincidence (Xs=Ys or Xs≠Ys) between sign bits a (=Xs) and b (=Ys) of data X and Y to generate coincidence detection result c. When this coincidence detection result c is valid (=1, true), that is, a=b (i.e., Xs=Ys), data inverter 10 inverts the logic of each bit of data Y (W=inverted Y).

When coincidence detection result c is invalid (=0, false), that is, a≠b (i.e., Xs≠Ys), data Y is directly supplied to adder 11 without being inverted by data inverter 10 (W=Y). Adder 11 adds data X, output W from data inverter 10, and coincidence detection result c. In this case, coincidence detection result c is used as a carry signal in adder 11.

Flag generator 13 outputs, as arithmetic operation flag SF, d (=Zs) when sign Xs of X is positive, i.e., a=0, and the logic-inverted d (=inverted Zs or/Zs) when sign Xs of X is negative, i.e., a=1.

The arithmetic operation circuit having this arrangement can generate arithmetic operation flag SF without calculating the absolute values of data X and Y.

The arithmetic operation circuit according to the above embodiment uses only one adder. The adder requires a relatively large number of elements (FIG. 9 (to be described later) shows a detailed example of a 4-bit adder). Since the arithmetic operation circuit uses only one adder requiring a relatively large number of circuit elements (conventional circuit requires two adders), the whole hardware amount is much smaller than that of the conventional circuit.

Since the absolute values of all input data need not be calculated in advance, the total time necessary for arithmetic processing is shortened.

Figure 2:
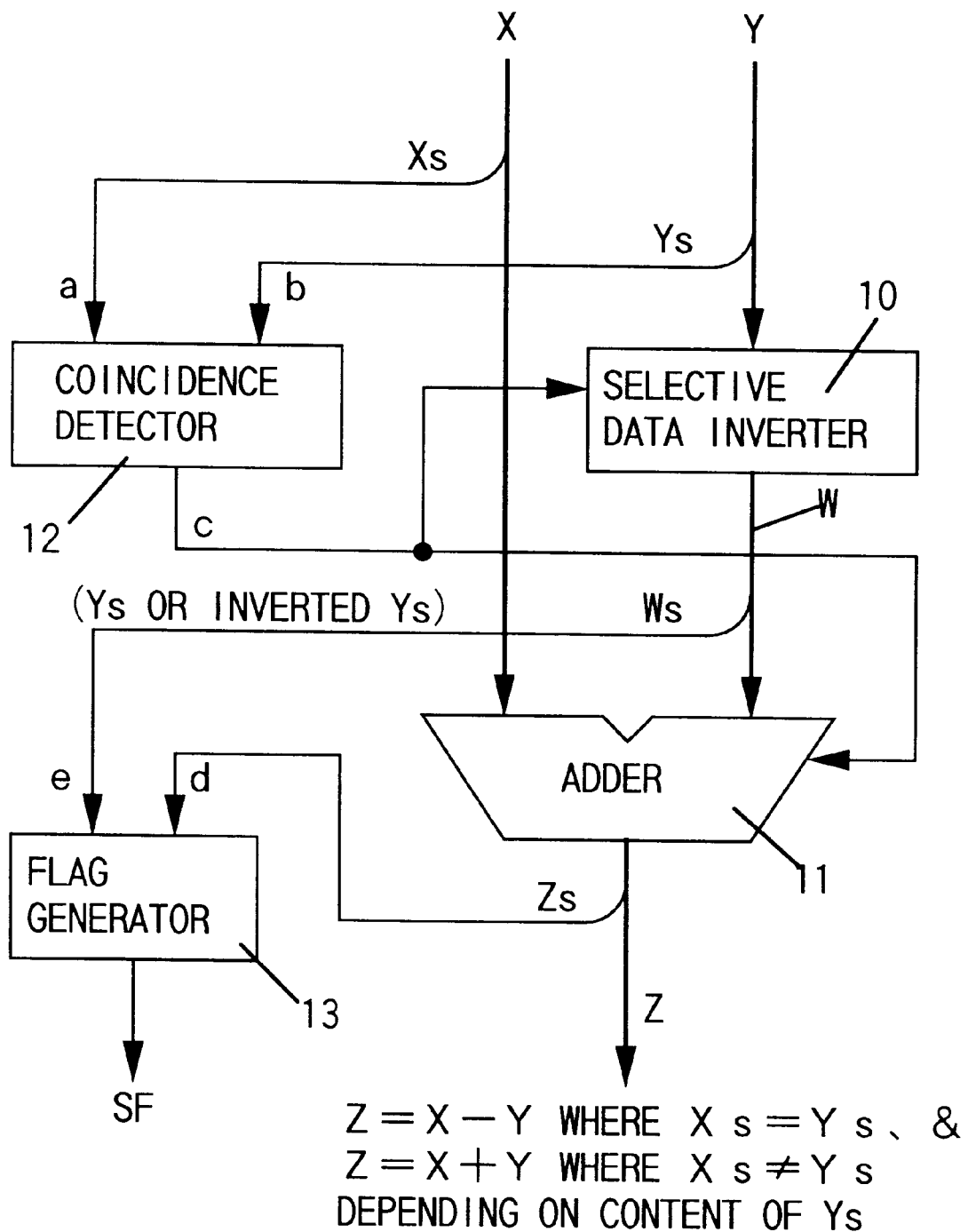
FIG. 2 is a block diagram showing the arrangement of an arithmetic operation circuit according to the second embodiment of the present invention.

FIG. 2 is a block diagram showing the arrangement of an arithmetic operation circuit according to the second embodiment of the present invention. This arithmetic operation circuit performs an arithmetic operation like the one shown in the table of FIG. 12 on the basis of the above-described principle to output, together with arithmetic operation result Z, the magnitude comparison result (arithmetic operation flag SF) of the absolute values of binary data X and Y each constituted by a plurality of bits expressed by two's complements. This arithmetic operation circuit is constituted by selective data inverter 10, adder 11, coincidence detector 12, and flag generator 13.

The embodiment in FIG. 2 is the same as the embodiment in FIG. 1 except that sign bit a (=Xs) of data X is supplied to flag generator 13 in FIG. 1, whereas sign bit e (=Ws) of output data W from data inverter 10 is supplied to flag generator 13 in FIG. 2.

In the arithmetic operation circuit shown in FIG. 2, when coincidence detection result c of coincidence detector 12 is valid (=1, true), i.e., a=b (Xs=Ys), the logical levels of all the bits of data Y are inverted within data inverter 10 because of c=1 (W=inverted Y).

When coincidence detection result c is invalid (=0, false), i.e., a≠b (Xs≠Ys), data Y is directly supplied to adder 11 without being inverted by data inverter 10 because of c=0 (W=Y).

Adder 11 adds data X, output W (=Y or inverted Y) from data inverter 10, and coincidence detection result c. In this case, coincidence detection result c is used as a carry signal in adder 11.

In this case, flag generator 13 outputs, as arithmetic operation flag SF, the logic-inverted d (=inverted Zs or/Zs) when sign bit e (Ws=Ys or inverted Ys) of output data W from data inverter 10 is positive, i.e., e =0, and d (=Zs) when W is negative, i.e., e =1.

The arithmetic operation circuit having this arrangement can also generate arithmetic operation flag SF without calculating the absolute values of data X and Y.

Since this arithmetic operation circuit uses only one adder, similar to the arithmetic operation circuit in FIG. 1, the whole hardware amount is much smaller than that of the conventional circuit. Since the absolute values of all input data need not be calculated in advance, unlike in the prior art, the time required for arithmetic processing is shortened.

Figure 3:
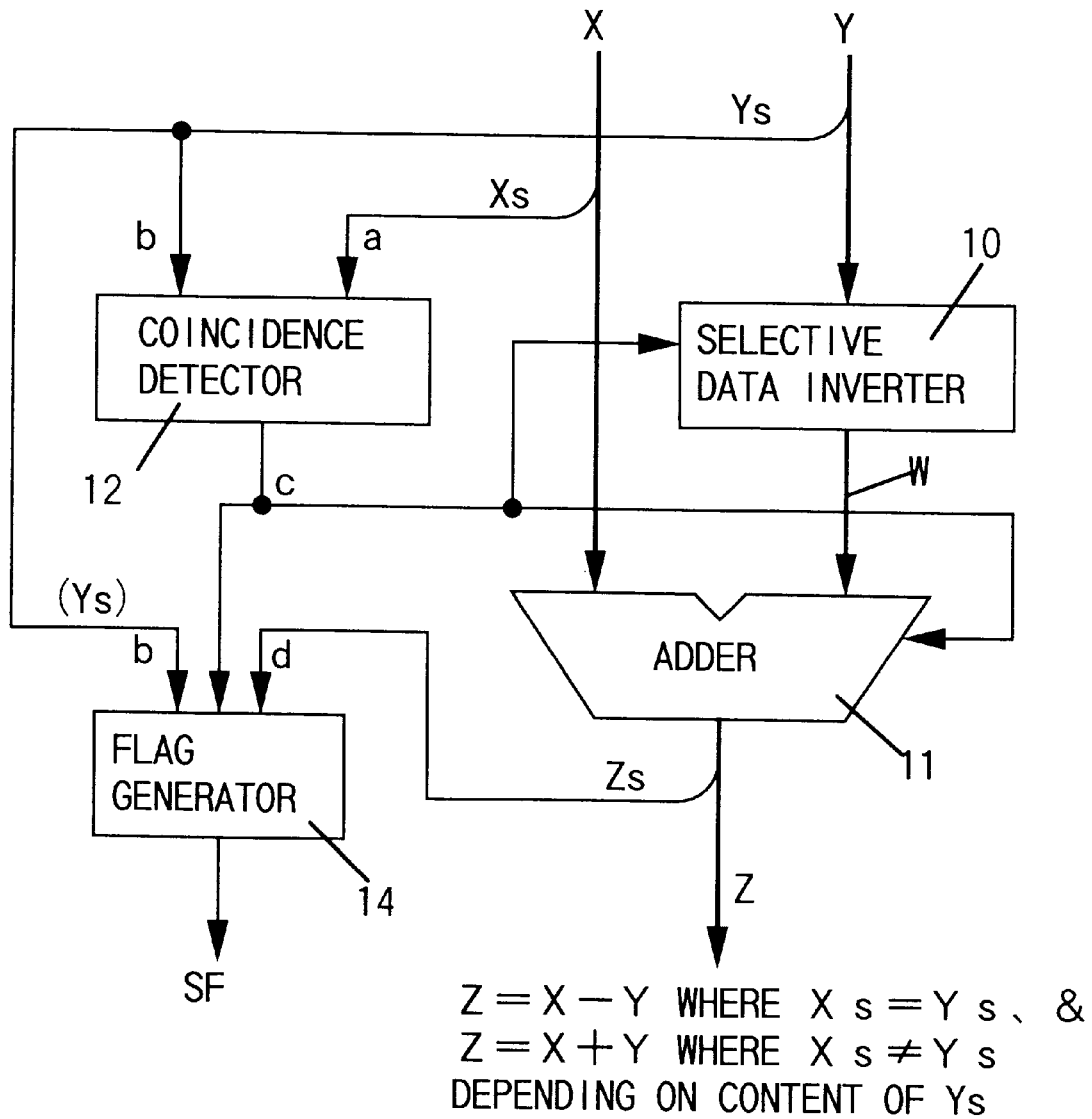
FIG. 3 is a block diagram showing the arrangement of an arithmetic operation circuit according to the third embodiment of the present invention.

FIG. 3 is a block diagram showing the arrangement of an arithmetic operation circuit according to the third embodiment of the present invention. This arithmetic operation circuit performs an arithmetic operation like the one shown in the table of FIG. 12 on the basis of the above-described principle to output, together with arithmetic operation result Z, the magnitude comparison result (arithmetic operation flag SF) of the absolute values of binary data X and Y each constituted by a plurality of bits expressed by the two's complements. This arithmetic operation circuit is constituted by selective data inverter 10, adder 11, coincidence detector 12, and flag generator 13.

The embodiment in FIG. 3 is the same as the embodiment in FIG. 2 except that sign bit e (=Ws) of data W is supplied to flag generator 13 in FIG. 2, whereas sign bit b (=Ys) of data Y, and coincidence detection result c from coincidence detector 12 are supplied to new flag generator 14 in FIG. 3.

Flag generator 14 in FIG. 3 receives sign bit b (=Ys) of data Y, coincidence detection result c from coincidence detector 12, and sign bit d (=Zs) of addition result Z. Flag generator 14 outputs, as arithmetic operation flag SF, the logic-inverted d (inverted Zs or/Zs) for b=c, and d (Zs) for b≠c.

The arithmetic operation circuit having this arrangement can also generate arithmetic operation flag SF without calculating the absolute values of data X and Y.

Since this arithmetic operation circuit uses only one adder, similar to the arithmetic operation circuit in FIG. 1 or 2, the whole hardware amount is much smaller than that of the conventional circuit. Since the absolute values of all input data need not be calculated in advance, unlike in the prior art, the time required for arithmetic processing is shortened.

Figure 4:
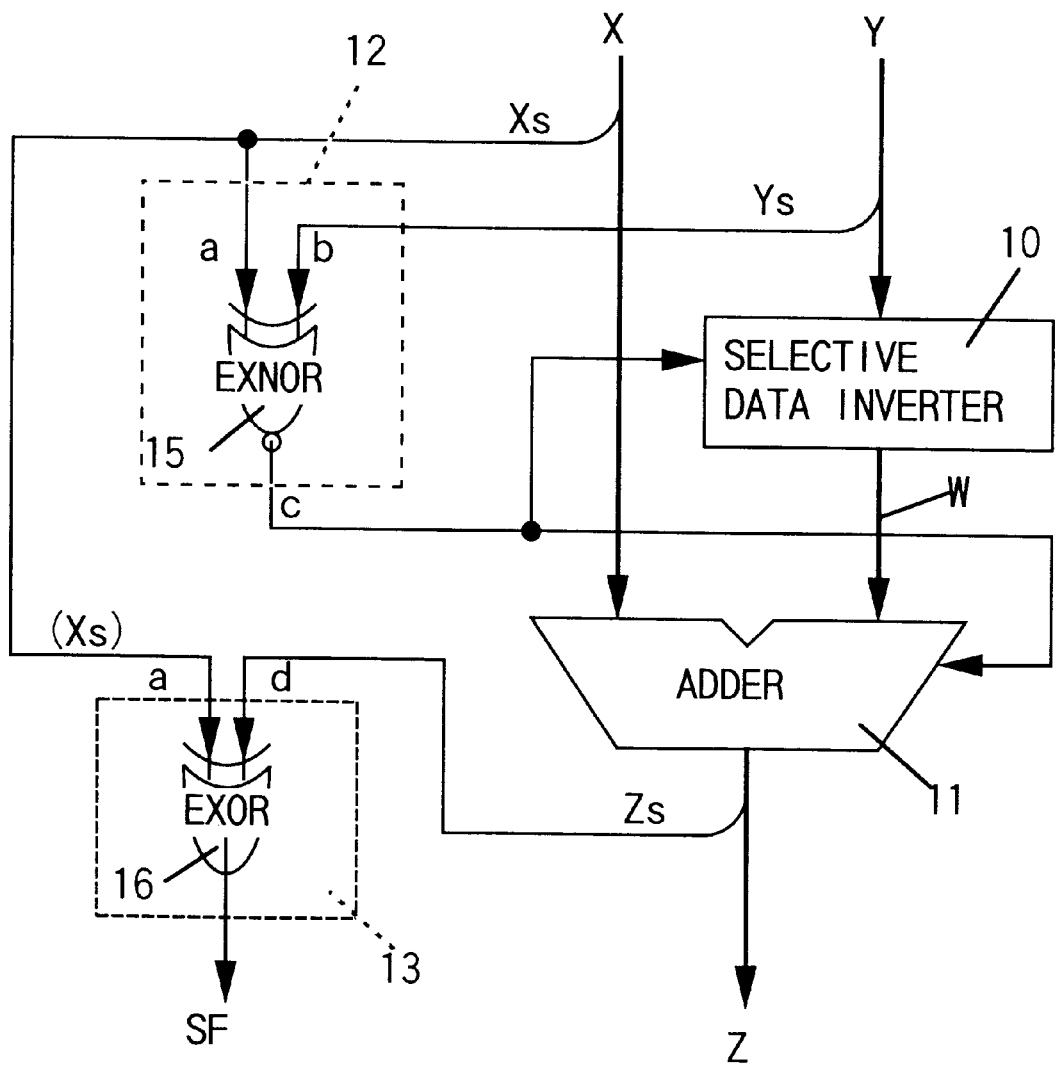
FIG. 4 is a circuit diagram showing in detail some circuits of the arithmetic operation circuit according to the first embodiment shown in FIG. 1.

FIG. 4 is a circuit diagram showing in detail some circuits of the arithmetic operation circuit shown in FIG. 1. In the arithmetic operation circuit of FIG. 4, coincidence detector 12 is constituted by exclusive NOR circuit (exclusive NOR gate) 15; and flag generator 13, by exclusive OR circuit (exclusive OR gate) 16.

Figure 5:
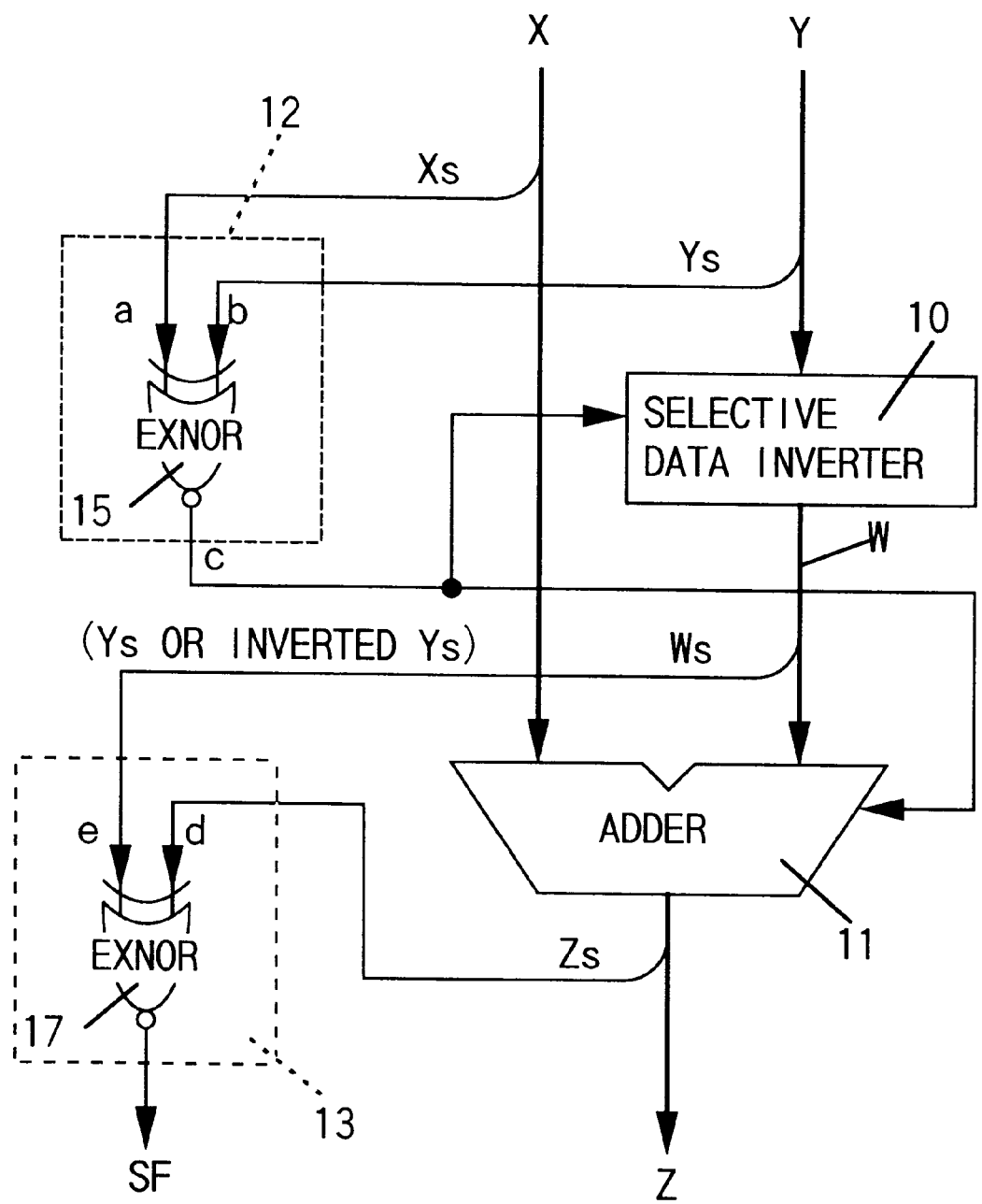
FIG. 5 is a circuit diagram showing in detail some circuits of the arithmetic operation circuit according to the second embodiment shown in FIG. 2.

FIG. 5 is a circuit diagram showing in detail some circuits of the arithmetic operation circuit shown in FIG. 2. In the arithmetic operation circuit of FIG. 5, coincidence detector 12 and flag generator 13 are respectively constituted by separate exclusive NOR circuits (exclusive NOR gates) 15 and 17.

Figure 6:
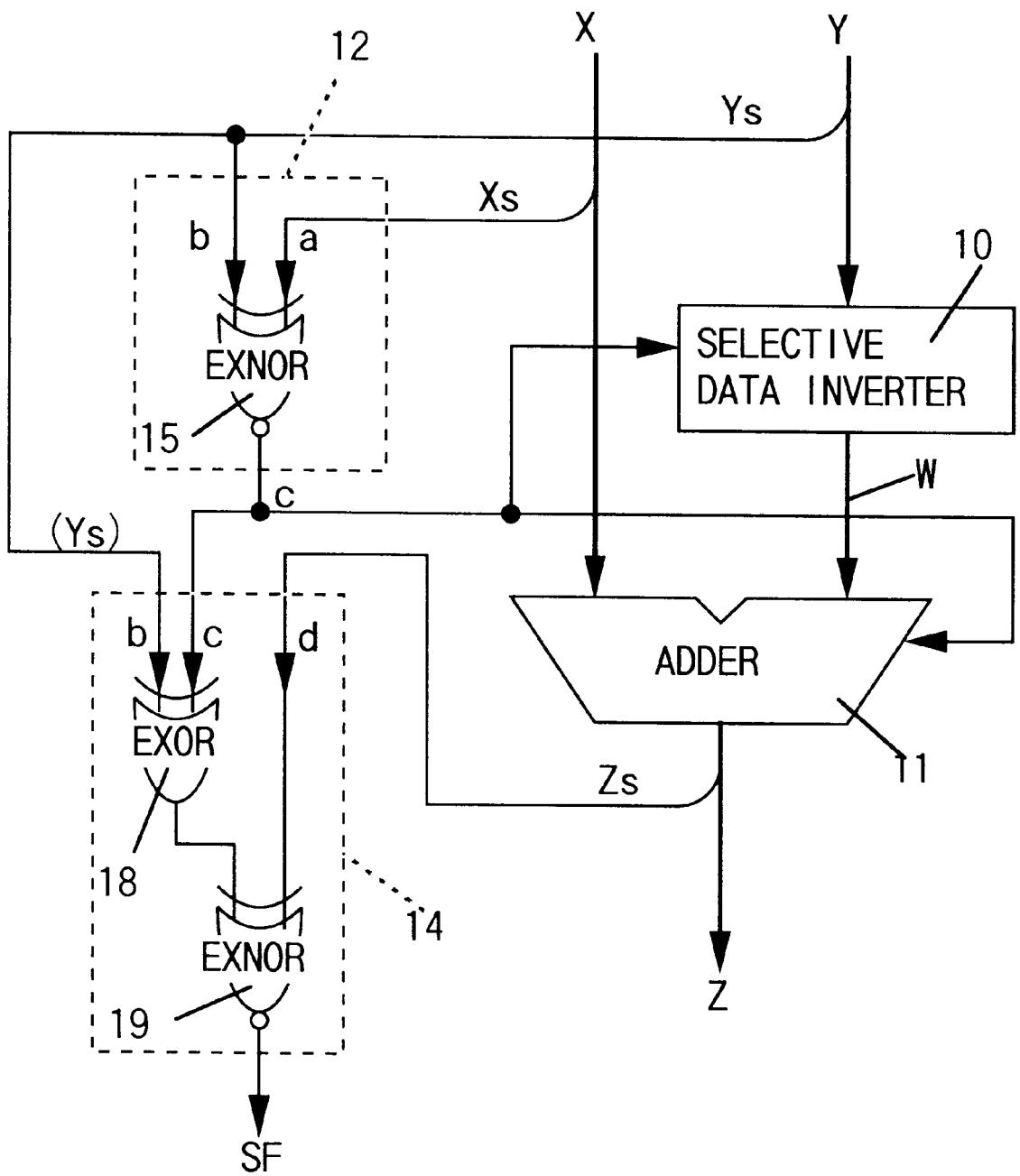
FIG. 6 is a circuit diagram showing in detail some circuits of the arithmetic operation circuit according to the third embodiment shown in FIG. 3.

FIG. 6 is a circuit diagram showing in detail some of the arithmetic operation circuit shown in FIG. 3. In the arithmetic operation circuit of FIG. 6, coincidence detector 12 is constituted by exclusive NOR circuit (exclusive NOR gate) 15; and flag generator 14, by exclusive OR circuit (exclusive OR gate) 18 and exclusive NOR circuit (exclusive NOR gate) 19.

In flag generator 14 of FIG. 6, sign bit b (=Ys) and coincidence detection result c are input to exclusive OR circuit 18. An output from exclusive OR circuit 18, and sign bit d (=Zs) are input to exclusive NOR circuit 19, which outputs arithmetic operation flag SF.

Figure 7:
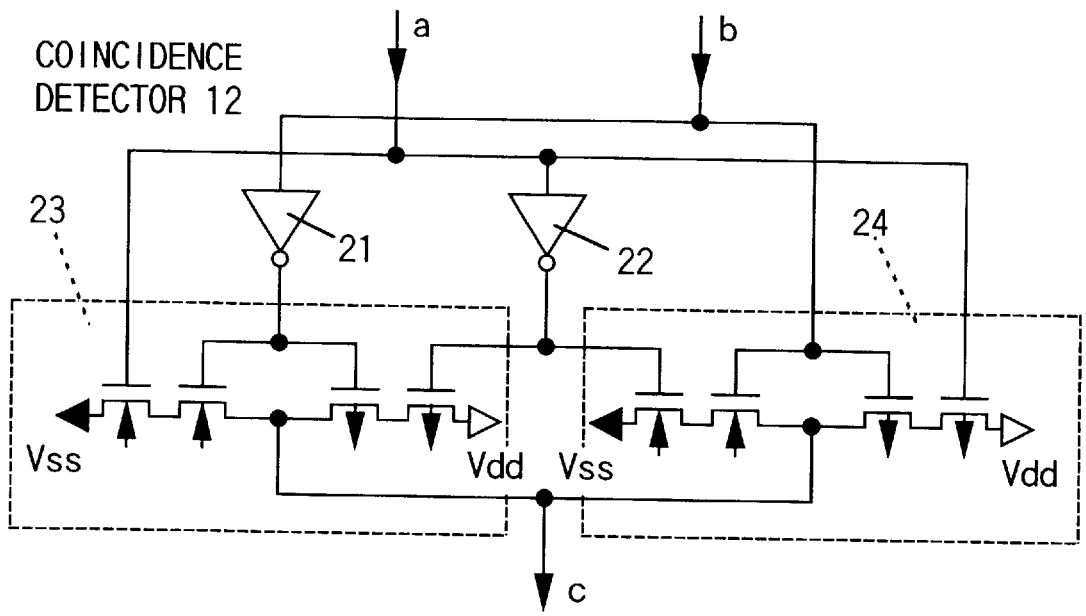
FIG. 7 is a circuit diagram showing another detailed arrangement example of a coincidence detector usable in each embodiment of the present invention.

FIG. 7 shows another detailed example of coincidence detector 12 usable in the respective embodiments shown in FIGS. 1 to 6. This coincidence detector 12 is constituted by two inverters 21 and 22 and two clocked inverters 23 and 24. Each of clocked inverters 23 and 24 is constituted by the series circuit of N-channel MOS transistors, and the series circuit of P-channel MOS transistors.

In FIG. 7, sign bit a (=Xs) of data X is supplied to the N-channel MOS transistor gate on the negative (Vss) side of clocked inverter 23, and the P-channel MOS transistor gate on the positive (Vdd) side of clocked inverter 24. This sign bit a (=Xs) is further supplied to the P-channel MOS transistor gate on the positive (Vdd) side of clocked inverter 23, and the N-channel MOS transistor gate on the negative (Vss) side of clocked inverter 24 through inverter 22.

Sign bit b (=Ys) of data Y is supplied to the gates of both the central P- and N-channel MOS transistors of clocked inverter 24. This sign bit b (=Ys) is further supplied to the gates of both the central P- and N-channel MOS transistors of clocked inverter 23 through inverter 21.

The drains of both the central P- and N-channel MOS transistors of clocked inverter 23 are connected to the drains of both the central P- and N-channel MOS transistors of clocked inverter 24. From this connection node, coincidence detection result c is extracted.

In this circuit arrangement, when sign bit a=1, clocked inverter 23 operates as an inverter, and clocked inverter 24 does not operate (input/output disconnection). When sign bit a=0, clocked inverter 24 operates as an inverter, and clocked inverter 23 does not operate (input/output disconnection).

If clocked inverter 23 operates (Xs=a=1), coincidence detection result c is equal to sign bit b (=Ys).

If clocked inverter 24 operates (Xs=a=0), coincidence detection result c is equal to the inverted value of sign bit b (=inverted Ys).

In FIG. 7, when sign bit a=b=1 (Xs=Ys=1), clocked inverter 23 operates, and coincidence detection result c=b=1 holds. When sign bit a=b=0 (Xs=Ys=0), clocked inverter 24 operates, and coincidence detection result c=inverted b=1. That is, a=b (Xs=Ys) leads to coincidence detection result c of 1.

When sign bit a≠b (Xs≠Ys), for example, a=1 and b=0, clocked inverter 23 operates, and coincidence detection result c=b=0 holds. When sign bit a=0 and b=1, clocked inverter 24 operates, and coincidence detection result c=inverted b=0 holds. That is, a≠b (Xs≠Ys) leads to coincidence detection result c of 0.

More specifically, the circuit arrangement in FIG. 7 performs an operation of representing coincidence (a=b)/noncoincidence (a≠b) of sign bits by the contents (1/0) of coincidence detection result c.

In other words, coincidence detector 12 shown in FIG. 7 has the same input/output logic as that of exclusive NOR circuit 15 in FIGS. 4 to 6 such that coincidence detection result c represents "1" only when sign bits a and b are the same.

Figure 8:
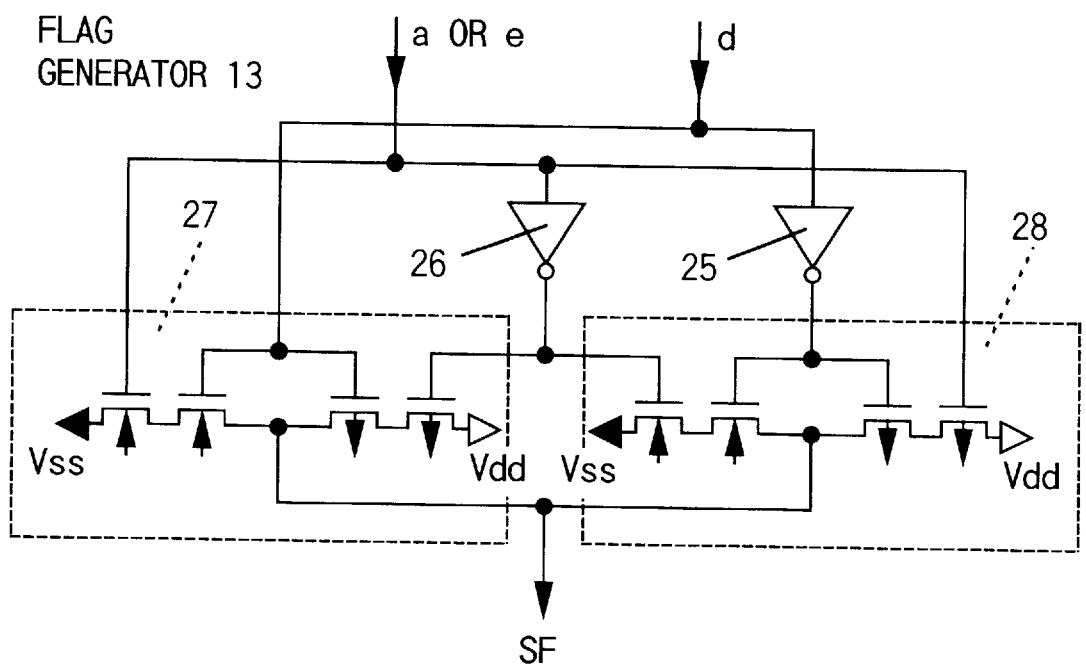
FIG. 8 is a circuit diagram showing another detailed arrangement example of a flag generator usable in each embodiment of the present invention.

FIG. 8 shows another detailed example of flag generator 13 usable in the respective embodiments shown in FIGS. 1 to 6. This flag generator 13 is constituted by two inverters 25 and 26 and two clocked inverters 27 and 28. Each of clocked inverters 27 and 28 is constituted by the series circuit of N-channel MOS transistors, and the series circuit of P-channel MOS transistors.

In FIG. 8, sign bit a (=Xs) of data X, or sign bit e (=Ws) of data W is supplied to the N-channel MOS transistor gate on the negative (Vss) side of clocked inverter 27, and the P-channel MOS transistor gate on the positive (Vdd) side of clocked inverter 28. This sign bit a (=Xs) or e (=Ws) is further supplied to the P-channel MOS transistor gate on the positive (Vdd) side of clocked inverter 27, and the N-channel MOS transistor gate on the negative (Vss) side of clocked inverter 28 through inverter 26.

Sign bit d (=Zs) of data Z is supplied to the gates of both the central P- and N-channel MOS transistors of clocked inverter 27. This sign bit d (=Zs) is further supplied to the gates of both the central P- and N-channel MOS transistors of clocked inverter 28 through inverter 25.

The drains of both the central P- and N-channel MOS transistors of clocked inverter 27 are connected to the drains of both the central P- and N-channel MOS transistors of clocked inverter 28. From this connection node, arithmetic operation flag SF is extracted.

In this circuit arrangement, when sign bit a=1 or e=1, clocked inverter 27 operates as an inverter, and clocked inverter 28 does not operate (input/output disconnection). When sign bit a=0 or e=0, clocked inverter 28 operates as an inverter, and clocked inverter 27 does not operate (input/output disconnection).

If clocked inverter 28 operates (a=0 or e=0), arithmetic operation flag SF is equal to sign bit d (=Zs).

If clocked inverter 27 operates (a=1 or e=1), arithmetic operation flag SF is equal to the inverted value of sign bit d (=inverted Zs or/Zs).

In FIG. 8, when sign bit a=0 or e=0, clocked inverter 28 operates, and arithmetic operation flag SF=d=Zs holds. When sign bit a=1 or e=1, clocked inverter 27 operates, and arithmetic operation flag SF=inverted Zs=/Zs holds.

More specifically, the circuit arrangement in FIG. 8 performs an operation of properly reversing sign Zs of arithmetic operation result Z depending on the contents (1/0) of sign bit a or e.

In other words, flag generator 13 shown in FIG. 8 has the same input/output logic as that of exclusive OR circuit 16 in FIG. 4.

Figure 9:
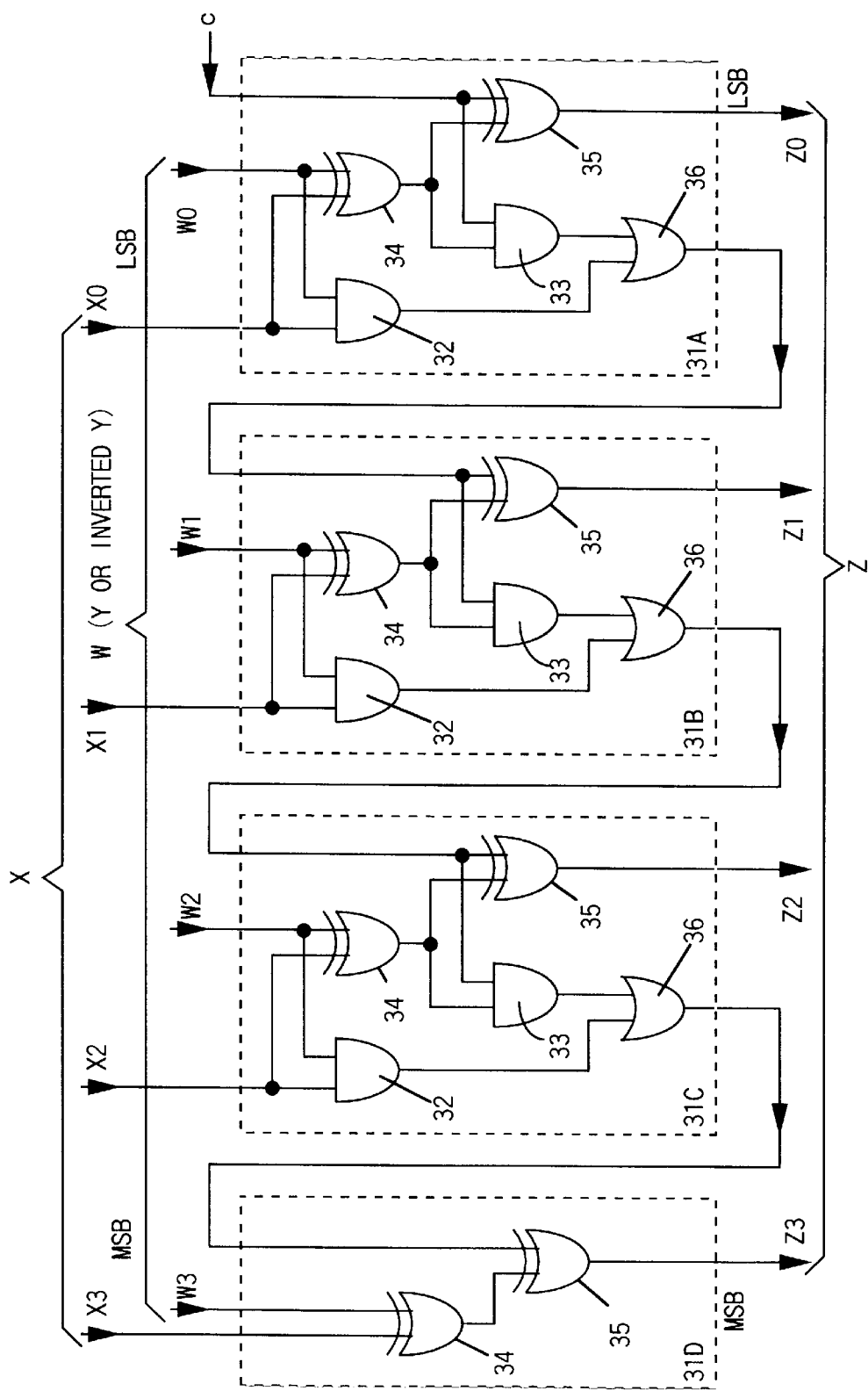
FIG. 9 is a circuit diagram showing a detailed arrangement example of an adder usable in each embodiment of the present invention.

FIG. 9 shows a detailed example of adder 11 usable in the respective embodiments shown in FIGS. 1 to 6. For descriptive convenience, the data width (data widths of data X and Y) processed by adder 11 is assumed to be four bits. For this reason, adder 11 in FIG. 9 is constituted by four partial adders 31A to 31D.

Except for, of partial adders 31A to 31D, partial adder 31D which calculates addition result Z3 of the most significant bit MSB, the remaining partial adders (31A to 31C) have the same circuit arrangement. The arrangement of partial adder 31A for the least significant digit will be first explained.

More specifically, the least significant bit X0 (LSB) of data X is supplied to the first inputs of AND gate 32 and exclusive OR gate 34. The least significant bit W0 (LSB) of data W is supplied to the second inputs of AND gate 32 and exclusive OR gate 34.

An output from exclusive OR gate 34 is supplied to the first inputs of AND gate 33 and exclusive OR gate 35. Coincidence detection result c from coincidence detector 12 is input, as a carry input signal, to the second inputs of AND gate 33 and exclusive OR gate 35. This exclusive OR gate 35 outputs the least significant bit Z0 (LSB) of arithmetic operation result Z.

An output from AND gate 32 is supplied to the first input of OR gate 36, and an output from AND gate 33 is supplied to the second input of OR gate 36. This OR gate 36 outputs a carry signal to the next partial adder 31B.

Partial adders 31B and 31C have the same circuit arrangement as that of partial adder 31A described above, and each of these partial adders executes an addition of the carry signal from the preceding stage as its own carry input signal.

Partial adder 31B receives the second bits (X1, W1) of data X and W to output the second bit (Z1) of arithmetic operation result Z. Partial adder 31C receives the third bits (X2, W2) of data X and W to output the third bit (Z2) of arithmetic operation result Z.

Since partial adder 31D for the most significant bit (MSB) is designed not to generate a carry signal to the output stage, its circuit arrangement is simpler than those of the remaining partial adders (31A to 31C).

More specifically, the most significant bit X3 (MSB) of data X is supplied to the first input of exclusive OR gate 34. The most significant bit W3 (MSB) of data W is supplied to the second input of exclusive OR gate 34.

An output from exclusive OR gate 34 is supplied to the first input of exclusive OR gate 35. A carry signal from partial adder 31C on the input stage is input to the second input of exclusive OR gate 35. This exclusive OR gate 35 outputs the most significant bit Z3 (MSB) of arithmetic operation result Z.

Figure 10:
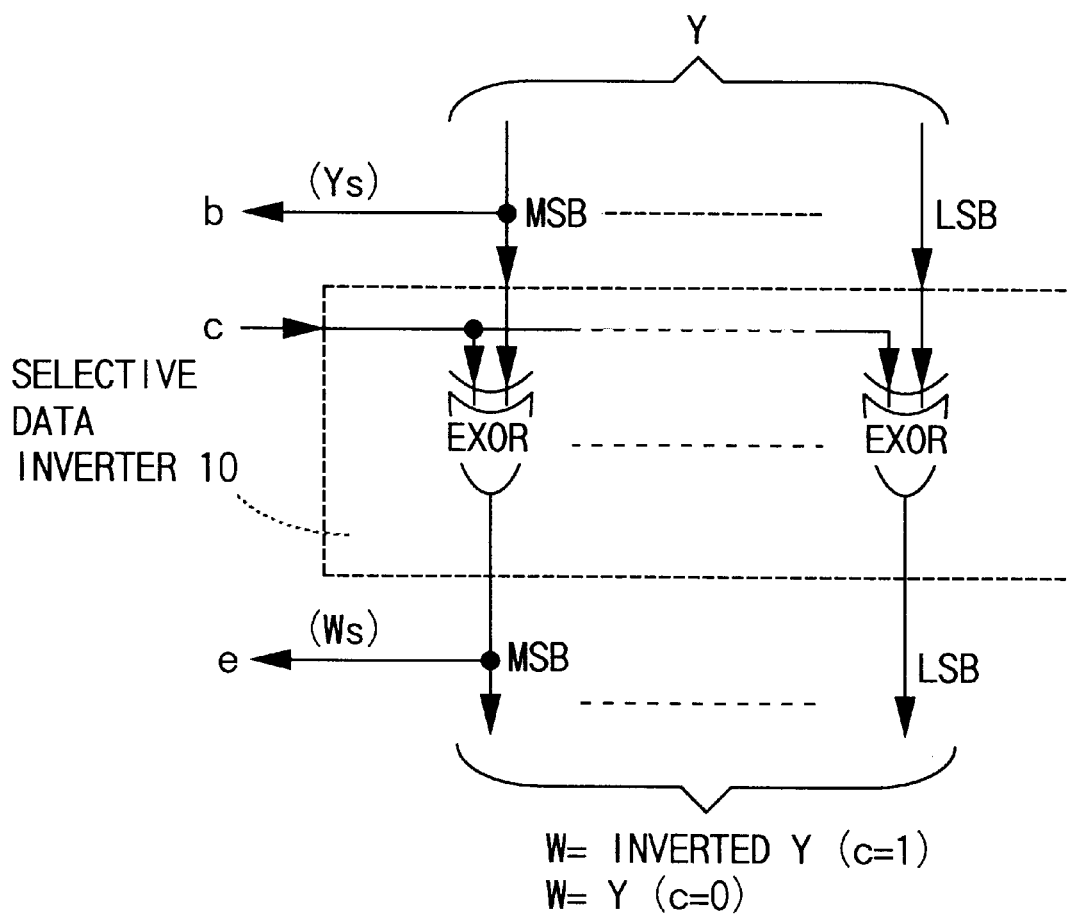
FIG. 10 is a circuit diagram showing a detailed arrangement example of a selective data inverter usable in each embodiment of the present invention.

FIG. 10 exemplifies a case wherein data inverter 10 in FIGS. 1 to 6 is realized by hardware. This data inverter 10 is constituted by a plurality of exclusive OR gates (with the same number as the number of bits of data Y) having the first inputs which commonly receive coincidence detection result c from coincidence detector 12, and the second inputs which separately receive the respective bits (LSB to MSB) of data Y.

When coincidence detection result c is at logical level "1", each exclusive OR gate operates as an inverter for inverting the level of each input (each bit of data Y).

When coincidence detection result c is at logical level "0", each exclusive OR gate operates as a buffer for passing the input (each bit of data Y) therethrough without changing its level.

As has been described above, according to the present invention, an arithmetic operation circuit wherein the magnitude relationship between binary numbers expressed by two's complements can be compared within a relatively short time without increasing the hardware amount can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An arithmetic operation circuit comprising:

first means for generating, in response to a sign bit of first binary input data and a sign bit of second binary input data, a truth coincidence detection signal when the sign bits coincide with each other, and a false coincidence detection signal when the sign bits do not coincide with each other;

second means for generating, in response to the first binary input data and the coincidence detection signal, an inverted binary signal obtained by inverting a logical level of each bit constituting the first binary input data when the coincidence detection signal is truth, and a non-inverted binary signal obtained without inverting the logical level of each bit constituting the first binary input data when the coincidence detection signal is false, and supplying a selection binary signal equal to either one of the inverted binary signal and the non-inverted binary signal in correspondence with the truth and false coincidence detection signals;

third means, connected to said first and second means, and responsive to the coincidence detection signal as a carry signal, for performing a binary operation for the second binary input data and the selection binary signal to supply an arithmetic operation result with a sign bit; and fourth means, connected to said third means, and responsive to the sign bit of the second binary input data and the sign bit of the arithmetic operation result, for supplying an arithmetic operation flag equal to either one of the sign bit of the arithmetic operation result, and an inverted sign bit obtained by inverting the sign bit of the arithmetic operation result, in correspondence with contents of the sign bit of the second binary input data.

2. A circuit according to claim 1, wherein the first binary input data and the second binary input data are expressed by binary numbers having a plurality of bits expressed by two's complements, and said third means includes an adder for performing an arithmetic operation of subtracting the first binary input data from the second binary input data when the coincidence detection signal is truth, and an arithmetic operation of adding the first binary input data to the second binary input data when the coincidence detection signal is false.

3. A circuit according to claim 1, wherein said fourth means includes means for supplying the arithmetic operation flag equal to the sign bit of the arithmetic operation result when the coincidence detection signal is truth, and the sign bit of the second binary input data indicates "positive", or when the coincidence detection signal is false, and the sign bit of the second binary input data indicates "positive".

4. A circuit according to claim 1, wherein said fourth means includes means for supplying the arithmetic operation flag equal to the inverted sign bit of the arithmetic operation result when the coincidence detection signal is truth, and the sign bit of the second binary input data indicates "negative", or when the coincidence detection signal is false, and the sign bit of the second binary input data indicates "negative".

5. A circuit according to claim 1, wherein said fourth means includes an exclusive OR gate which receives the sign bit of the second binary input data and the sign bit of the arithmetic operation result, when the sign bit of the second binary input data has a logical level indicating "positive", the sign bit of the arithmetic operation result is output as the arithmetic operation flag from said exclusive OR gate, and when the sign bit of the second binary input data has a logical level indicating "negative", the inverted sign bit of the arithmetic operation result is output as the arithmetic operation flag from said exclusive OR gate.

6. A circuit according to claim 1, wherein said first means includes an exclusive NOR gate which receives the sign bit of the first binary input data and the sign bit of the second binary input data, when the sign bit of the first binary input data is equal to the sign bit of the second binary input data, the truth coincidence detection result indicating "sign coincidence" is output from said exclusive NOR gate, and when the sign bit of the first binary input data is not equal to the sign bit of the second binary input data, the false coincidence detection signal indicating "sign noncoincidence" is output from said exclusive NOR gate.

7. An arithmetic operation circuit comprising:

first means for generating, in response to a sign bit of first binary input data and a sign bit of second binary input data, a truth coincidence detection signal when the sign bits coincide with each other, and a false coincidence detection signal when the sign bits do not coincide with each other;

second means for generating, in response to the first binary input data and the coincidence detection signal, an inverted binary signal obtained by inverting a logical level of each bit constituting the first binary input data when the coincidence detection signal is truth, and a non-inverted binary signal obtained without inverting the logical level of each bit constituting the first binary input data when the coincidence detection signal is false, so as to supply a selection binary signal equal to either one of the inverted binary signal and the non-inverted binary signal in correspondence with the truth and false coincidence detection signals;

third means, connected to said first and second means, and responsive to the coincidence detection signal as a carry signal, for performing a binary operation for the second binary input data and the selection binary signal to supply an arithmetic operation result with a sign bit; and fourth means, connected to said second and third means, and responsive to the sign bit of the selection binary signal and the sign bit of the arithmetic operation result, for supplying an arithmetic operation flag equal to either one of the sign bit of the arithmetic operation result, and an inverted sign bit obtained by inverting the sign bit of the arithmetic operation result in correspondence with contents of the sign bit of the first binary input data.

8. A circuit according to claim 7, wherein the first binary input data and the second binary input data are expressed by binary numbers having a plurality of bits expressed by two's complements, and said third means includes an adder for performing an arithmetic operation of subtracting the first binary input data from the second binary input data when the coincidence detection signal is truth, and an arithmetic operation of adding the first binary input data to the second binary input data when the coincidence detection signal is false.

9. A circuit according to claim 7, wherein said fourth means includes means for supplying the arithmetic operation flag equal to the sign bit of the arithmetic operation result when the coincidence detection signal is truth and the sign bit of the first binary input data indicates "positive", or when the coincidence detection signal is false and the sign bit of the first binary input data indicates "negative".

10. A circuit according to claim 7, wherein said fourth means includes means for supplying the arithmetic operation flag equal to the inverted sign bit of the arithmetic operation result when the coincidence detection signal is truth and the sign bit of the first binary input data indicates "negative", or when the coincidence detection signal is false and the sign bit of the first binary input data indicates "positive".

11. A circuit according to claim 7, wherein said fourth means includes an exclusive NOR gate which receives the sign bit of the selection binary signal and the sign bit of the arithmetic operation result, and wherein when the sign bit of the selection binary signal has logical level "1", the sign bit of the arithmetic operation result is output as the arithmetic operation flag from said exclusive NOR gate, and when the sign bit of the selection binary signal has logical level "0", the inverted sign bit of the arithmetic operation result is output as the arithmetic operation flag from said exclusive NOR gate.

12. A circuit according to claim 7, wherein said first means includes an exclusive NOR gate which receives the sign bit of the first binary input data and the sign bit of the second binary input data, and wherein when the sign bit of the first binary input data is equal to the sign bit of the second binary input data, the truth coincidence detection result indicating "sign coincidence" is output from said exclusive NOR gate, and when the sign bit of the first binary input data is not equal to the sign bit of the second binary input data, the false coincidence detection signal indicating "sign noncoincidence" is output from said exclusive NOR gate.

13. An arithmetic operation circuit comprising:

first means for generating, in response to a sign bit of first binary input data and a sign bit of second binary input data, a truth coincidence detection signal when the sign bits coincide with each other, and a false coincidence detection signal when the sign bits do not coincide with each other;

second means for generating, in response to the first binary input data and the coincidence detection signal, an inverted binary signal obtained by inverting a logical level of each bit constituting the first binary input data when the coincidence detection signal is truth, and a non-inverted binary signal obtained without inverting the logical level of each bit constituting the first binary input data when the coincidence detection signal is false, so as to supply a selection binary signal equal to either one of the inverted binary signal and the non-inverted binary signal in correspondence with the truth and false coincidence detection signals;

third means, connected to said first and second means, and responsive to the coincidence detection signal as a carry signal, for performing a binary operation for the second binary input data and the selection binary signal to supply an arithmetic operation result with a sign bit; and fourth means, connected to said first and third means, and responsive to the coincidence detection signal and the sign bit of the arithmetic operation result, for supplying an arithmetic operation flag equal to either one of the sign bit of the arithmetic operation result, and an inverted sign bit obtained by inverting the sign bit of the arithmetic operation result in correspondence with contents of the sign bit of the first binary input data.

14. A circuit according to claim 13, wherein the first binary input data and the second binary input data are expressed by binary numbers having a plurality of bits expressed by two's complements, and said third means includes an adder for performing an arithmetic operation of subtracting the first binary input data from the second binary input data when the coincidence detection signal is truth, and an arithmetic operation of adding the first binary input data to the second binary input data when the coincidence detection signal is false.

15. A circuit according to claim 13, wherein said fourth means includes means for supplying the arithmetic operation flag equal to the sign bit of the arithmetic operation result when the coincidence detection signal is truth and the sign bit of the first binary input data indicates "positive", or when the coincidence detection signal is false and the sign bit of the first binary input data indicates "negative".

16. A circuit according to claim 13, wherein said fourth means includes means for supplying the arithmetic operation flag equal to the inverted sign bit of the arithmetic operation result when the coincidence detection signal is truth and the sign bit of the first binary input data indicates "negative", or when the coincidence detection signal is false and the sign bit of the first binary input data indicates "positive".

17. A circuit according to claim 13, wherein said fourth means includes an exclusive OR gate which receives the sign bit of the first binary input data and the coincidence detection signal, and an exclusive NOR gate which receives an output from said exclusive OR gate, and the sign bit of the arithmetic operation result, and wherein when the sign bit of the first binary input data does not coincide with the coincidence detection signal, the sign bit of the arithmetic operation result is output as the arithmetic operation flag from said exclusive NOR gate, and when the sign bit of the first binary input data coincides with the coincidence detection signal, the inverted sign bit of the arithmetic operation result is output as the arithmetic operation flag from said exclusive NOR gate.

18. A binary operating system, wherein, when Y represents first binary input data having a first sign bit Ys; X, second binary input data having a second sign bit Xs; Z, an operation result of the first binary input data Y and the second binary input data X; Zs, a sign bit of Z; /Zs, a sign-inverted bit of Z; and SF, an arithmetic operation flag which determines whether the binary operation result Z is positive or negative, under respective conditions in which the first sign bit Ys is equal to the second bit Xs, and in which the first sign bit Ys is different from the second sign bit Xs, said system comprising:

means for performing the following arithmetic operation depending on whether the second sign bit Xs indicates "positive" or "negative":

| Condition | Xs | Z | SF |
| --- | --- | --- | --- |
| Xs = Ys | Positive | Z = X − Y | SF = Zs |
| Xs = Ys | Negative | Z = X − Y | SF = /Zs |
| Xs ≠ YS | Positive | Z = X + Y | SF = Zs |
| Xs ≠ Ys | Negative | Z = X + Y | SF = /Zs | and means for outputting said binary operation result Z.

19. A system according to claim 18, wherein the first binary input data Y and the second binary input data X are defined as two's complements.

20. A binary operation system, wherein, when Y represents first binary input data having a first sign bit Ys; X, second binary input data having a second sign bit Xs; Z, an operation result of the first binary input data Y and the second binary input data X; Zs, a sign bit of Z; /Zs, a sign-inverted bit of Z; and SF, an arithmetic operation flag which determines whether the binary operation result Z is positive or negative, under respective conditions in which the first sign bit Ys is equal to the second sign bit Xs, and in which the first sign bit Ys is different from the second sign bit Xs, said system comprising:

means for performing the following arithmetic operation depending on whether the first sign bit Ys indicates "positive" or "negative":

| Condition | Ys | Z | SF |
| --- | --- | --- | --- |
| Xs = Ys | Positive | Z = X − Y | SF = Zs |
| Xs = Ys | Negative | Z = X − Y | SF = /Zs |
| Xs ≠ YS | Positive | Z = X + Y | SF = /Zs |
| Xs ≠ Ys | Negative | Z = X + Y | SF = Zs | and means for outputting said binary operation result Z.

21. A system according to claim 20, wherein the first binary input data Y and the second binary input data X are defined as two's complements.

22. A binary operation system, wherein, when Y represents first binary input data having a first sign bit Ys; X, second binary input data having a second sign bit Xs; Z, an operation result of the first binary input data Y and the second binary input data X; Zs, a sign bit of Z; /Zs, a sign-inverted bit of Z; and SF, an arithmetic operation flag which determines whether the binary operation result Z is positive or negative, under respective conditions in which the first sign bit Ys is equal to the second sign bit Xs, and in which the first sign bit Ys is different from the second sign bit Xs, said system comprising:
means for performing the following arithmetic operation depending on whether the first sign bit Ys and the second sign bit Xs indicate "positive" or "negative":

| Condition | Xs | Ys | Z | SF |
|---|---|---|---|---|
| Xs = Ys | Positive | Positive | Z = X − Y | SF = Zs |
| Xs = Ys | Negative | Negative | Z = X − Y | SF = /Zs |
| Xs ≠ YS | Positive | Negative | Z = X + Y | SF = Zs |
| Xs ≠ Ys | Negative | Positive | Z = X + Y | SF = /Zs | and means for outputting said binary operation result Z.

23. A system according to claim 22, wherein the first binary input data Y and the second binary input data X are defined as two's complements.

24. An arithmetic operation circuit comprising:
coincidence detection means, responsive to respective sign bits of first and second input data each constituted by a binary number having a plurality of bits expressed by a two's complement, for outputting a truth coincidence detection signal when the two sign bits coincide with each other, and a false coincidence detection signal when the sign bits do not coincide with each other;
signal output means, responsive to the first input data and the coincidence detection signal, for outputting a logic-inverted signal of each bit of the first input data when the coincidence detection signal is truth, and a signal equal to the first input data when the coincidence detection signal is false;
addition means, responsive to the second input data and the signal output from said signal output means as binary addition signals, and responsive to the coincidence detection signal as a carry signal, for outputting a sum of the binary addition signals; and
flag generation means, responsive to the sign bit of the second input data and a sign bit of the sum output from said addition means, for selectively outputting either of the sign bit of the sum and an inverted bit of the sign bit.

25. An arithmetic operation circuit comprising:
coincidence detection means, responsive to respective sign bits of first and second input data each constituted by a binary number having a plurality of bits expressed by a two's complement, for outputting a truth coincidence detection signal when the two sign bits coincide with each other, and a false coincidence detection signal when the sign bits do not coincide with each other;
signal output means, responsive to the first input data and the coincidence detection signal, for outputting a logic-inverted signal of each bit of the first input data when the coincidence detection signal is truth, and a signal equal to the first input data when the coincidence detection signal is false;
addition means, responsive to the second input data and the signal output from said signal output means as binary addition signals, and responsive to the coincidence detection signal as a carry signal, for outputting a sum of the binary addition signals; and
flag generation means, responsive to a sign bit of the output signal from said signal output means and a sign bit of the sum output from said addition means, for selectively outputting either of the sign bit of the sum and an inverted bit of the sign bit.

26. An arithmetic operation circuit comprising:
coincidence detection means, responsive to respective sign bits of first and second input data each constituted by a binary number having a plurality of bits expressed by a two's complement, for outputting a truth coincidence detection signal when the two sign bits coincide with each other, and a false coincidence detection signal when the sign bits do not coincide with each other;
signal output means, responsive to the first input data and the coincidence detection signal, for outputting a logic-inverted signal of each bit of the first input data when the coincidence detection signal is truth, and a signal equal to the first input data when the coincidence detection signal is false;
addition means, responsive to the second input data and the signal output from said signal output means as binary addition signals, and responsive to the coincidence detection signal as a carry signal, for outputting a sum of the binary addition signals; and
flag generation means, responsive to the sign bit of the first input data, the coincidence detection signal, and a sign bit of the sum output from said addition means, for selectively outputting either of the sign bit of the sum and an inverted bit of the sign bit.

* * * * *

UNITED STATES PATENT AND TRADEMARK OFFICE
CERTIFICATE OF CORRECTION

PATENT NO.    : 5,944,771
DATED         : August 31, 1999
INVENTOR(S)   : Mikio Shiraishi It is certified that error appears in the above-identified patent and that said Letters Patent is hereby corrected as shown below:

<u>Title page,</u>
Item [22], Filed: change filing data from "September 11, 1997" to
-- September 12, 1997--.

Signed and Sealed this

Sixth Day of August, 2002

Attest:

Attesting Officer

JAMES E. ROGAN
Director of the United States Patent and Trademark Office